(12) United States Patent
Davies

(10) Patent No.: US 6,676,076 B1
(45) Date of Patent: Jan. 13, 2004

(54) TWO STAGE SHOCK STRUT

(75) Inventor: John W. Davies, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/317,334

(22) Filed: Dec. 12, 2002

(51) Int. Cl.$^7$ .............................................. B64C 25/10
(52) U.S. Cl. ............................ 244/102 R; 244/104 FP; 188/314
(58) Field of Search ....................... 244/102 SS, 100 R, 244/103 R, 104 FP, 104 R; 188/280, 314, 316, 266

(56) References Cited

U.S. PATENT DOCUMENTS

| | | | |
|---|---|---|---|
| 2,396,318 A | * | 3/1946 | De Bell |
| 2,916,283 A | | 12/1959 | Westcott, Jr. |
| 3,056,598 A | | 10/1962 | Conway et al. |
| 3,140,084 A | | 7/1964 | Schmidt |
| 3,244,385 A | * | 4/1966 | Fehring et al. |
| 3,888,436 A | | 6/1975 | Sealey |
| 4,630,788 A | * | 12/1986 | Veaux et al. |
| 4,634,082 A | | 1/1987 | Kendall |
| 4,770,372 A | | 9/1988 | Ralph |
| 4,907,760 A | * | 3/1990 | Sealey et al. |
| 4,915,324 A | * | 4/1990 | Foreau et al. |
| 5,152,547 A | * | 10/1992 | Davis |
| 5,310,139 A | * | 5/1994 | Derrien et al. |
| 5,423,402 A | * | 6/1995 | de Kock |

* cited by examiner

Primary Examiner—Tien Dinh
(74) Attorney, Agent, or Firm—Alston & Bird LLP

(57) ABSTRACT

A shock strut for supporting and dampening a load with a two-phase dampening characteristic. The shock strut includes an inner cylinder slidably mounted within an outer cylinder, each of the cylinders having slidably mounted therein a piston. A first one of the pistons in the outer cylinder defines a first gas chamber, a second one of the pistons in the inner cylinder defines a second gas chamber. Between the cylinders is a metering device that defines a third and fourth fluid chambers. At full extension of the shock strut, a first stage of dampening is provided as the first gas chamber is compressed by fluid flowing through the metering device into the third chamber from the fourth chamber. As the shock strut is compressed, a second stage of dampening is provided by fluid flowing through the metering device into the fourth chamber and compressing the second gas chamber.

16 Claims, 4 Drawing Sheets

TWO STAGE SHOCK STRUT

BACKGROUND OF THE INVENTION

1. Field of the Invention

The present invention is related to the use of shock struts, and more particularly the use of shock struts having two cambers, or stages, of dampening characteristics.

2. Description of Related Art

Generally, shock struts are used to cushion or dampen loads on various types of vehicles and machinery. Beyond the various load characteristics that must be considered when selecting a shock strut, practical concerns such as available space and weight must also be considered. Shock struts used for aircraft typify such constraints. While the aircraft is in flight, the shock strut and the landing wheel carried by it are usually retracted into the aircraft fuselage or wing. The presence of the well imposes restrictions on the location of structural members, fuel tanks and other components. Therefore, it is desirable to minimize the size of the landing gear. Further, the height of the landing gear is affected by the length of its shock strut and the amount of retraction or projection of the shock strut during loading. The height of the landing gear, in turn, affects the "sill height" of the airplane, which is the height of the door opening on the fuselage when the plane is resting on the tarmac. For very large planes taller landing gear places the sill height out of reach of much of the ground equipment designed to service smaller airplanes.

U.S. Pat. No. 3,888,436 to Sealey ("Sealey") discloses an airplane landing gear. The landing gear includes an inner cylinder 11 and an outer cylinder 10, as shown in FIG. 1 of Sealey. During compression, the inner cylinder moves within the outer cylinder and causes fluid from a Chamber F to be forced between a metering pin 29 and an orifice lip 21, as shown in FIG. 2 of Sealey. The fluid flows upward inside a tube 16 and into Chamber A through ports 22 so as to compress the gas in Chamber A. Increased pressure in Chamber A, in turn, drives fluid from Chamber A through ports 24 to enter Chamber G. Because the flow between the metering pin and the lip is constricted, the pressure in Chamber F rises rapidly as the strut is initially compressed and provides a hard spring for the large forces that occur during landing.

After initial compression, the pressure in Chamber D gradually increases as liquid is metered into it through taxi bleed ports 35. A piston 32 defining one end of Chamber D disengages a bleed port cylinder 30 at the other end of Chamber D and the fluid flows with greater freedom from Chamber F into Chamber D, as shown in FIG. 4 of Sealey. Also, as the piston moves downward it compresses a gas in Chamber C. In this manner the two gas volumes in Chambers A and C are in operation and provide a relatively soft spring for the lower forces that occur during taxiing. Despite the advantages of the landing gear disclosed by Sealey, additional adaptations and improvements in shock-strut design are desirable to fit newer aircraft and airport standards.

It would be advantageous to have a shock strut that provides two-phases of support, one for touchdown upon landing and another for taxiing of the aircraft. In addition, it would be advantageous if the shock strut were to have a compact construction so as to allow its use on planes having sill height restrictions.

BRIEF SUMMARY OF THE INVENTION

The present invention addresses the above needs and achieves other advantages by providing a shock strut for supporting and dampening a load with a two-phase dampening characteristic. The shock strut includes an inner cylinder slidably mounted within an outer cylinder, each of the cylinders having slidably mounted therein a piston. A first one of the pistons in the outer cylinder defines a first gas chamber, a second one of the pistons in the inner cylinder defines a second gas chamber. In between the cylinders is a metering device that defines a third and fourth fluid chambers between it and the first and second pistons, respectively. The metering device controls fluid flow between the third and fourth fluid chambers. At full extension of the shock strut, a first stage of dampening is provided by the first gas chamber is compressed by fluid flowing into the third chamber from the fourth chamber. As the shock strut is compressed, a second stage of dampening is provided by fluid flowing into the fourth chamber and compressing the second gas chamber.

A shock strut of one embodiment of the present invention for supporting and dampening a load with a two-phase dampening characteristic includes an outer cylinder, an inner cylinder, first and second pistons and a fluid metering device. Each of the outer and inner cylinders have closed and open ends. The inner cylinder is slidably mounted within the open end of the outer cylinder. Slidably mounted between the ends of the outer cylinder is the first piston, which defines a first fluid chamber between it and the closed end of the outer cylinder. Slidably mounted between the ends of the inner cylinder is the second piston, which defines a second fluid chamber between it an the closed end of the outer cylinder. Positioned between the pistons is a fluid metering device, wherein a third fluid chamber is defined between the metering device and the first piston. The third fluid chamber is on an opposite side of the first piston from the first fluid chamber. The metering device also defines a fourth fluid chamber between it and the second piston, on an opposite side of the second piston from the second fluid chamber. The metering apparatus progressively controls fluid flow into the third and fourth chambers, leading to compression of the first and second fluid chambers. Compression of the first and second fluid chambers results in the two-phase dampening characteristic.

In one aspect, the first and second fluid chamber contain a fixed amount of a gas and the third and fourth chambers contain a relatively incompressible fluid, such as a hydraulic fluid.

In another aspect, the fluid metering apparatus includes a metering pin extending through an orifice defined by a metering plate. The metering pin defines an elongate opening having sufficient length to maintain fluid communication between the third and fourth fluid chambers from full extension through full compression of the shock strut. A clearance defined between the metering pin and plate is configured to control fluid flow from a fifth chamber into the fourth chamber, causing compression of the second piston and the second fluid chamber. The elongate opening of the metering pin may also include a neck on an end adjacent the first fluid chamber to further control fluid flow.

In still another aspect, the outer cylinder of the shock strut may include a housing for supporting therein a first piston-supporting wall structure. The first piston-supporting wall structure is configured to slidably support the first piston. In addition, the inner cylinder may include its own housing for supporting therein a second piston-supporting wall structure configured to slidably support the second piston. A metering pin of the metering device is supported on an open end of the first piston-supporting wall structure. A metering plate of the metering device may be supported on an open end of the second piston-supporting wall structure. Extending through the metering plate is the metering pin.

Optionally, the metering device may include a fifth fluid chamber in fluid communication with the third fluid chamber through at least one orifice defined in the first piston-supporting wall. In addition, fluid communication is established between the fifth fluid chamber and the fourth fluid chamber through a clearance defined between the metering pin and the metering plate.

The shock-strut of the present invention has several advantages. It has two-stage loading characteristics that provide sufficient stiffness to resist high landing forces in the first stage, and increased stiffness for a less bouncy taxiing ride. The arrangement of the fluid chambers provides the second stage loading characteristics at a height sufficiently low to allow docking of the aircraft at standard airport gates and access by standard airport equipment. This also allows the extended shock strut pressure to be low enough to lessen the impact load at touchdown. The compact profile also allows the shock-strut to be retrofit into pre-existing aircraft configured for single-stage, conventional shock-struts. This design will allow a single shock strut to be used without replacing the inner and outer cylinders. The use of the metering pin and the metering plate provides a robust, all mechanical fluid metering device for use in an aircraft.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
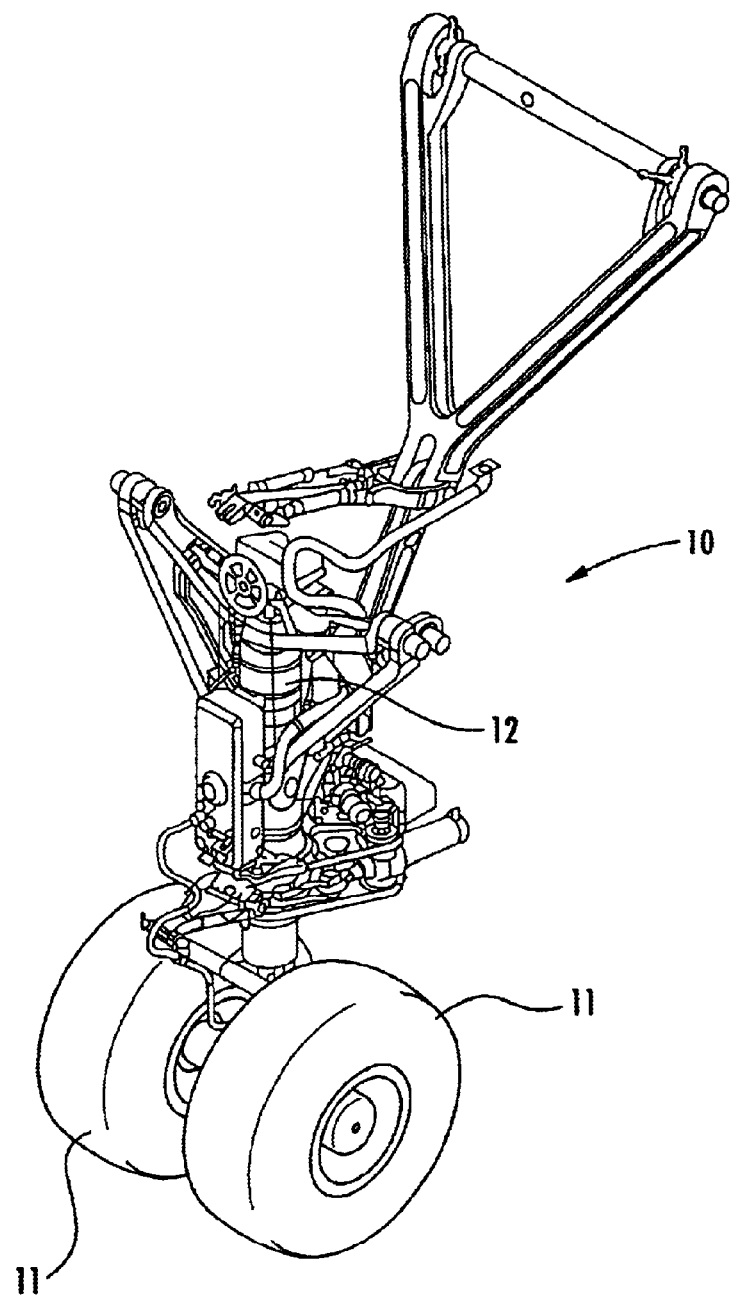
FIG. 1 is a perspective view of a two-stage shock strut of one embodiment of the present invention.
Figure 2:
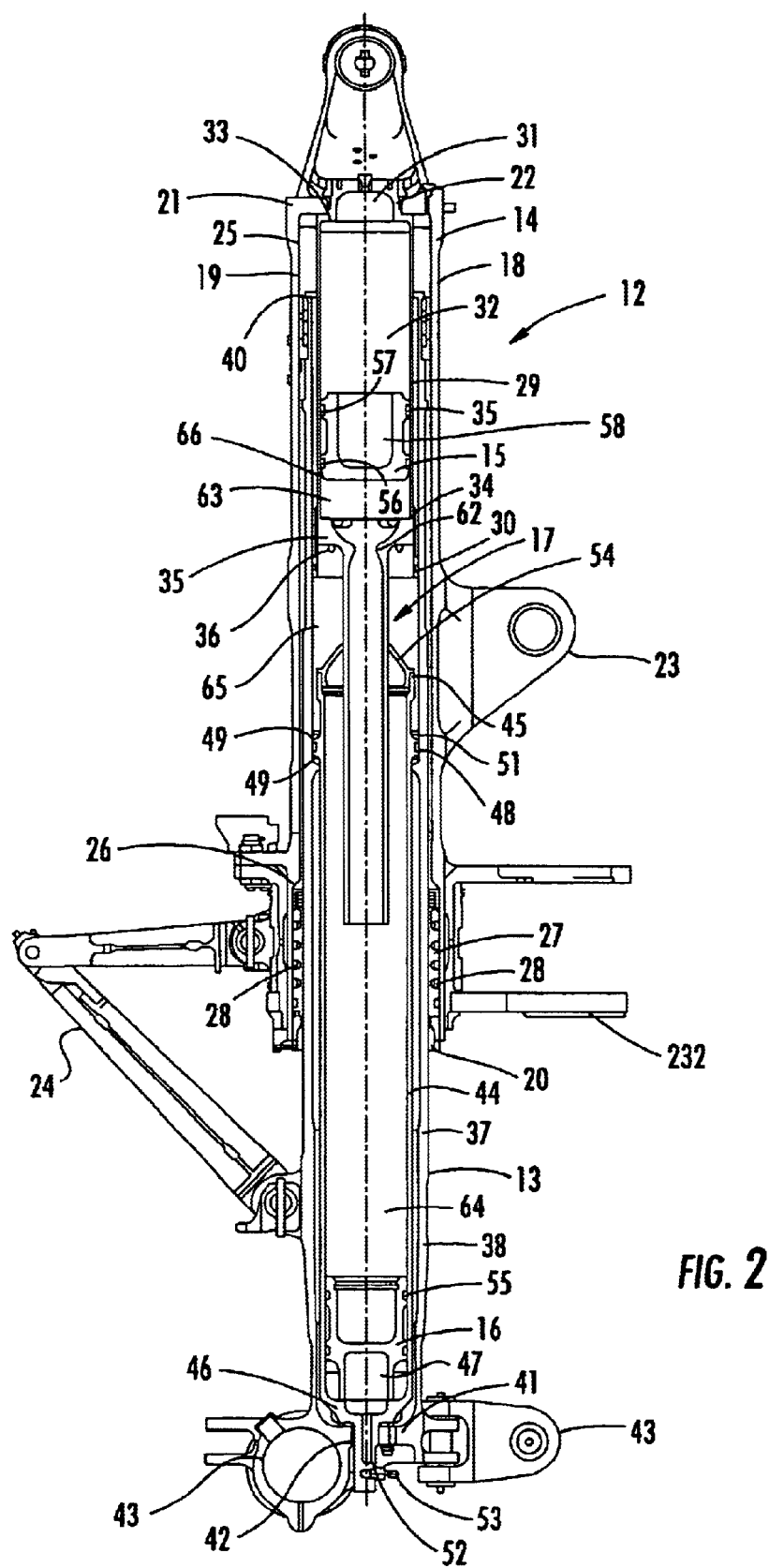
FIG. 2 is a sectional view of the two-stage shock strut shown in FIG. 1.

An aircraft landing gear 10 including a pair of wheels 11 connected to, and supported by, a two-stage shock strut 12 of one embodiment of the present invention is shown in FIG. 1. Generally, the shock strut includes an inner cylinder 13 mounted within an outer cylinder 14, as shown in FIG. 2. Within the outer and inner cylinders are housed first and second pistons 15 and 16, respectively. The pistons are separated by a fluid metering device 17. The relative positioning of the cylinders, pistons and fluid metering device defines four fluid chambers that provide two-stage dampening and support characteristics. Although the preferred embodiment is illustrated in the context of an aircraft, the strut of the present invention could be useful in other applications such as automotive applications or even in simple mechanical devices, such as a part of a damper assembly for a door.

The outer cylinder 14 includes a housing 18 having a cylindrical wall 19 defining an opening 20 at one end and an end plate 21 defining another opening 22 at its other end. Preferably, the housing wall 19 and the end plate 21 are constructed of a high-strength and corrosion resistant material (such as 180 to 200 ksi stainless steel) so as to withstand aircraft landing forces. Other materials that can be used include aluminum and titanium. Of course, for lower load applications thinner and/or lower strength materials could be used, such as plastics or non-tempered metals. Use of lower strength materials could also be compensated for with thicker structure for the wall 19 and the end plate 21.

A plurality of mounts 23 are formed on the outside of the outer cylinder housing 18 and provide fixation points for the various external connections of the shock strut 12 to the other parts of the landing gear 10 and the aircraft. For instance, one of the mounts 23 serves as a connection for a torsion link 24 that connects the inner and outer cylinders 13, 14, restrains twisting and acts as a steering device. Regardless, the various external connections and the torsion link are known to those of skill in the art and are therefore not described herein in further detail.

An inner surface 25 of the cylindrical wall 21 has a constant diameter with the exception of a shoulder 26 formed by a slightly larger diameter adjacent the opening 20. The larger diameter and the shoulder 26 retains a primary cylindrical seal 27 that extends between the inner surface 25 of the cylindrical wall 21 and the inner cylinder 13, allowing relative movement between the inner and outer cylinders without leakage of hydraulic fluid. The primary seal can contain several sealing rings 28 that are biased to abut the inner surface 25 of the cylindrical wall 21 or the inner cylinder 13.

The outer cylinder 14 also includes a first piston-supporting wall 29 that has a cylindrical shape defining an open end 30, a closed end 31 and a cylindrical bore extending between the ends. Within the cylindrical bore of the piston-supporting wall 29 is slidably mounted the first piston 15 which defines a first fluid chamber 32 between it and the closed end 31 of the supporting wall, as shown in FIG. 2. The piston-supporting wall 29 may also define a shoulder 33 adjacent its closed end 31 that acts as a stop for travel of the first piston 15. In addition, the shoulder 33 defines a portion of the chamber 32 that is not accessed by the first piston 15. Associated with the shoulder 33 is an external portion of the supporting wall 29 that extends inwards forming a ledge 39 that abuts the end plate 21 of the housing. The remaining portion of the closed end 31 extends through the opening 22 of the end plate. In this manner, the housing 18 provides support for the piston-supporting wall 29, as shown in FIG. 2.

At the other, open end 30 of the piston-supporting wall 29 is a second shoulder 34 that is configured to retain a metering pin 35 of the fluid metering device 17, as will be described in more detail below. At about midway between the second shoulder 34 and the open end 30, the piston-supporting wall 29 defines a plurality of slow leak orifices 36, the operation of which will also be described in more detail below.

The inner cylinder 13 also includes a housing 37 having a cylindrical wall 38 defining an opening 40 at one end and an end plate 41 defining an opening 42 at the other end. The preferred materials for constructing the inner cylinder housing 37 are similar, or the same, as those for the outer cylinder housing 18. Mounts 43 are formed on the outside of the inner cylinder housing 37 that serve as connections to other parts of the landing gear and aircraft, including the torsion link that connects the inner and outer cylinders 13, 14. Also, the bottom one of the mounts 43 serves as a connection for an axle supporting the wheels 11 and the other one of the mounts 43 is a tow fitting.

The inner cylinder also includes a second piston-supporting wall 44 that has a cylindrical shape defining an open end 45, a closed end 46 and a cylindrical bore extending between the ends. Within the cylindrical bore of the second piston-supporting wall 44 is slidably mounted the second piston 16 which defines a second fluid chamber 47 between it and the closed end 46 of the second piston-supporting wall, as shown in FIG. 2. The second piston-supporting wall 44 includes an external seal 48 that extends around the second piston-supporting wall near the open end 45. The external seal 48 also extends between the second piston-supporting wall and the inner cylinder housing 37. A pair of annular retainer lips 49 extend around the second piston-supporting wall 44 and define a groove that retains the external seal 48. The second piston-supporting wall 44 may be constructed of the same, or similar, materials as the first piston-supporting wall 29.

A thrust ledge 51 restricts movement of the piston-supporting wall 44 within the inner cylinder housing 37 in the opposite direction. The second piston-supporting wall 44 is further supported at its closed end 46 by abutting the end plate 41 of the inner cylinder housing 37. A fluid supply conduit 52 is formed by the end plate 41 and extends through the opening 42 in the end plate 41. At the end of the fluid supply conduit 52 is a nipple 53 onto which fluid supply lines may be connected. At the open end 45 of the second piston supporting wall 44 is mounted a metering plate 54 of the fluid metering device 17. Upward motion of the cylinder is supported by bolts at the closed end 46. It should be noted that the necessity for, as well as the size and configuration of, ledges and other restraining geometry, will differ depending upon the loads which the shock strut 12 is expected to support.

Each of the pistons 15, 16 has a cylindrical shape and includes a plurality of piston rings 55 extending around its circumference and spaced along its length. The piston rings extend between the first and second pistons 15, 16 and the inside surface of the respective first and second piston support walls 29, 44. The piston rings 55 seal the space between pistons and the support walls against the passage of hydraulic fluid. The piston rings 55 are retained within annular grooves 56 extending around the circumference of each of the pistons 15, 16. Elastic seals may also be retained in the annular grooves 56, such as the elastic seals 57 in the illustrated embodiment having a T-shaped cross-section. The elastic seals further inhibit fluid flow and provide resilient support for the piston rings 55.

The first piston 15 defines a cavity 58 on its underside which retains some of the fluid in the first reservoir. The cavity reduces the amount of compression of the fluid in the first fluid chamber 32 for the first piston 15 to reach the limit of its travel against the closed end 31. The second piston 16 has an H-shaped cross-section that partially defines a cavity on the side defining the second fluid chamber 47 and having a similar function as the cavity 58 of the first piston 15. Another cavity is defined on the other side of the second piston 16 and is sized and shaped to allow clearance for the metering pin 35. The design of the pistons 15, 16 could be varied, however, and still achieve the same effect of defining a pair of fluid-filled chambers isolated from the third and fourth chambers 63, 64. For instance, a flat, cylindrical disk could be used in place of the illustrated-cylinders defining concavities.

The metering device 17 forms a third fluid chamber 63 between it and the side of the first piston 15 opposite the first fluid chamber 32. The metering device 17 also forms a fourth fluid chamber 64 between it and the side of the second piston 16 opposite the second fluid chamber 47. As mentioned above, the illustrated metering device 17 includes the metering pin 36 and the metering plate 54. However, other metering devices that control the flow between the third and fourth fluid chambers 63, 64 could be used such as a valve or valves electronically controlled to provide the desired fluid flow characteristics.

The metering pin 35 includes a cylindrical, elongate tube 60 supported by a cylindrical base 61 having about twice the diameter of the elongate tube. The metering pin's cylindrical base is supported by the second shoulder 34 at the open end 30 of the first piston-supporting wall 29. Extending from the base 61 in the direction of the second piston 16, and through the metering plate 54 is the elongate tube 60. The internal diameter of the metering pin tube 60 varies along its axial length so as to control fluid flow therethrough. The metering pin is tapered so as it passes through the orifice plate it varies the size of the fluid path which controls the vertical reaction of the shock strut. In particular, the internal diameter of the tube forms a neck 62 as it extends into a concavity 62 defined within the base 61 that partially defines the third fluid chamber 63. The neck 62 serves to further restrict fluid flow through the metering pin 35 into the third fluid chamber 63.

A fifth fluid chamber 65 is formed between the metering pin 35 and the metering plate 54 and acts as part of the metering device 17 in controlling fluid flow between the third and fourth fluid chambers 63, 64. A portion of the fifth fluid chamber 65 is a sub-chamber 66 formed between the first piston supporting wall 29 and the outer cylinder housing 18. Alternative metering devices, such as the electronically controlled valve listed above, may not have a fifth fluid chamber 65 but its use is preferred due to a need for mechanical robustness. The external diameter of the metering pin tube 60 also restricts flow through the metering plate 54. Generally, more closely matching the external diameter of the metering pin tube 60 to the opening in the metering plate 54 results in less flow between the fifth fluid chamber 65 and the fourth fluid chamber 64. Fluid flow between the sub-chamber 66 and the rest of the fifth fluid chamber 64 is metered by the slow leak orifices 36 defined by the first piston-supporting wall 44.

Varying types of fluids can be used in the chambers 32, 47, and 64–66. However, The fourth, fifth and sixth chambers preferably share the same fluid as they are in fluid communication in the illustrated embodiment. Preferably, the fluid is a relatively incompressible hydraulic fluid so that the relative volume contained within each of the fourth, fifth and sixth chambers is solely controlled by the fluid flow between them through the metering pin 35, plate 54 and various other orifices and not the compression of the hydraulic fluid shared therebetween. Conversely, each of the first and second fluid chambers 32, 47 are self-contained and preferably contain a compressible, or semi-compressible fluid such as a gas. Examples of the gasses include nitrogen or air, and the hydraulic fluids may include hydrocarbon based fluids, fluids sold under the trade name SKYDROL, or other relatively incompressible fluids.

It should be noted that although the Figures illustrate cylinders each having multiple walls, other cylinder configurations could be used wherein the four fluid chambers 32, 47, and 64–66 are formed by different configurations of relatively fluid-impermeable enclosures. For instance, the inner and outer cylinders 13, 14 could each have a single wall that serves as structural support and piston support. Alternatives could also be used for the cylinders themselves, such as by substituting non-cylindrical tubes that are nested so as to slide with respect to each other and define the four fluid chambers, at least two of which are formed by free-floating non-cylindrical separators. These alternative cylinder assemblies could be combined with the aforementioned variations in metering devices and still fall within the scope of the present invention.

Figure 5:
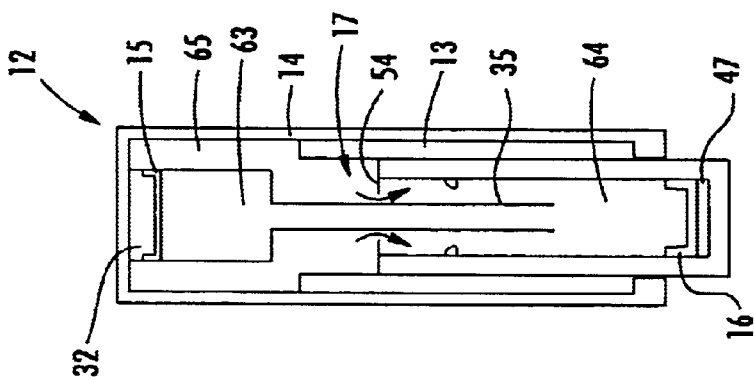
FIG. 5 is a schematic showing the two-stage shock strut of FIG. 2 during a second phase of loading with the second gas chamber compressing.
Figure 4:
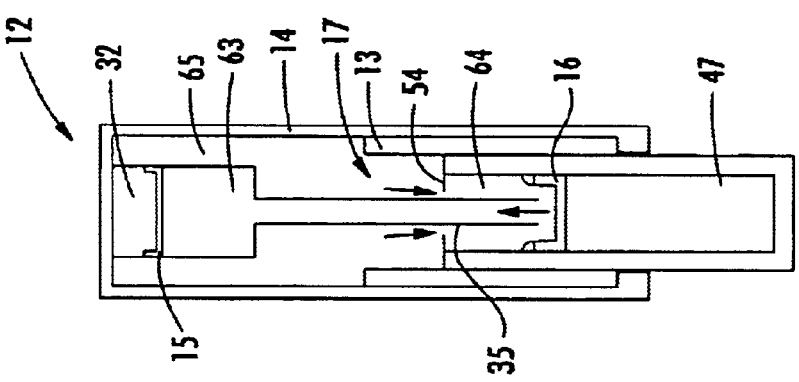
FIG. 4 is a schematic showing the two-stage shock strut of FIG. 2 during the first phase of loading with the first gas chamber compressing.
Figure 3:
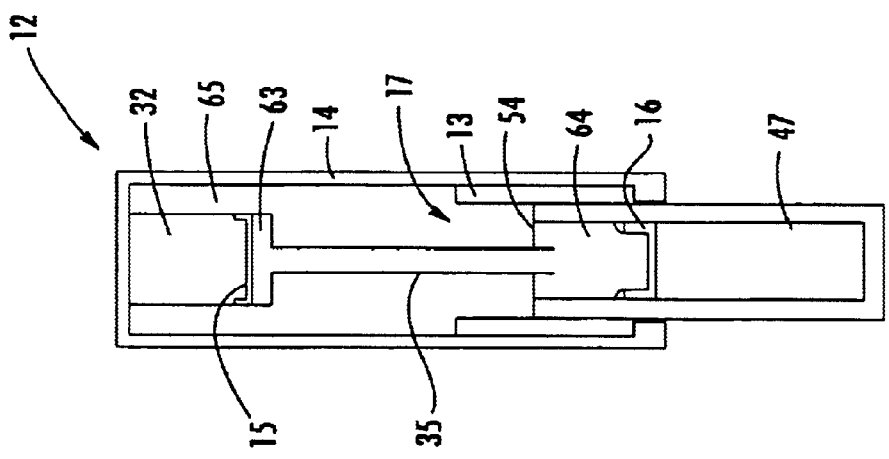
FIG. 3 is a schematic showing the two-stage shock strut of another embodiment of the present invention in full extension prior to a first phase of loading.

Upon landing, or other loading in non-aviation uses, the shock strut 12 is compressed from the fully extended position shown schematically in FIG. 3, through a first stage of compression shown schematically in FIG. 4 to a second stage of compression shown schematically in FIG. 5.

In the fully extended position, the first piston 15 abuts, or nearly abuts, the base 61 of the metering pin 35 wherein the third fluid chamber 63 is at its smallest volume and the first fluid chamber 32 is at its largest volume. As the initial load is applied in the first stage, the hydraulic fluid is urged from the fourth fluid chamber 64 through the metering pin 35 into the third fluid chamber 63. The increased volume of the third fluid chamber compresses the gas in the first fluid chamber 32. As the end of the metering pin 35 approaches the second piston 16, fluid flows from the fifth chamber between the metering pin and the metering plate 54 into the fourth chamber 64. In the second stage (typically during taxiing), the first piston 15 and the gas in the first chamber 32 have reached maximum compression. Fluid flow from the fifth chamber 65 into the fourth chamber 64 urges the second piston 16 toward the closed end 46 of the second piston-supporting wall 44. Notably, the shock strut 12 is at its shortest length during taxiing so that the aircraft has a suitable sill height for standard airport gates and other equipment.

Figure 6:
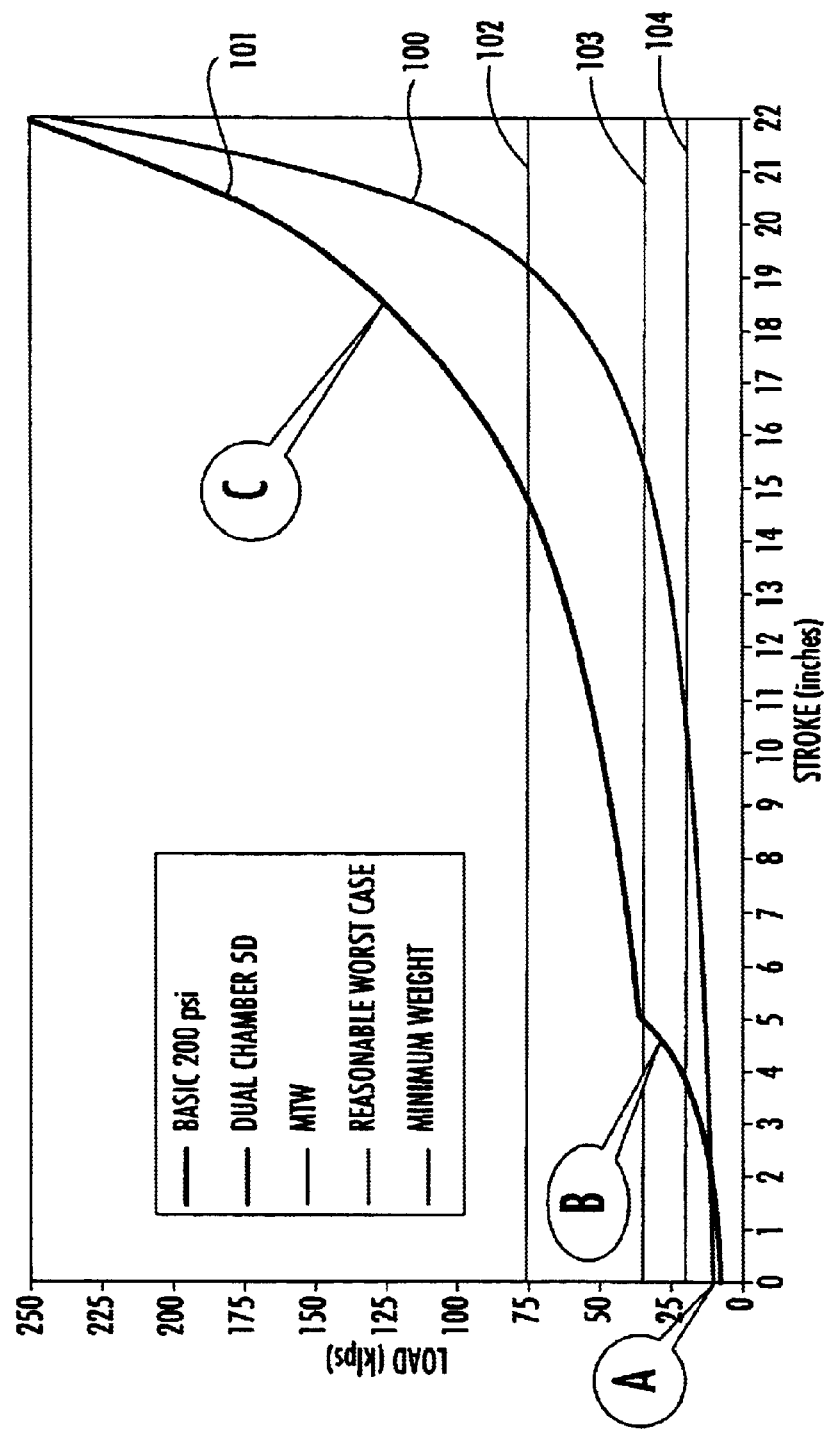
FIG. 6 is a graphical depiction of a two-phase loading profile of another embodiment of the present invention compared to a single-phase loading profile of a conventional shock strut.

FIG. 6 illustrates a comparison of the loading characteristics between the two-stage shock strut 12 of the present invention and a conventional single-stage shock strut. A single-stage loading curve 100 shows the single-stage shock strut's response at high loads (such as landing) and near full extension when large forces are required for small displacements. At the stroke decreases, much lower load changes are required for larger compression of the conventional shock-strut. In contrast, a dual-stage loading curve 101 shows a relatively stiff profile at maximum stroke C for landing with stiffness decreasing as the profile passes through a reasonable worst case load of 75 kips 102. As more compression occurs, the shock strut 12 has a sudden increase in stiffness B as it falls below a mean taxi weight of about 35 kips 103. Finally, at the static weight of the aircraft of about 20 kips 104 the stiffness has decreased again. The sudden increase at B serves to minimize large, relatively undamped displacements while taxiing which can jostle crew and passengers. The loads described on the curve of FIG. 6 are for a single type of aircraft, but the characteristics of the two stages may be modified to suit different sized aircraft and other applications.

The shock-strut of the present invention has several advantages. It has two-stage loading characteristics that provide sufficient stiffness to resist high landing forces in the first stage, and increased stiffness for a less bouncy taxiing ride. The arrangement of the fluid chambers 32, 47, and 64–66 provides the second stage loading characteristics at a height sufficiently low to allow docking of the aircraft at standard airport gates and access by standard airport equipment. The compact profile also allows the shock-strut 12 to be retrofit into pre-existing aircraft configured for single-stage, conventional shock-struts. The use of the metering pin 35 and the metering plate 54 provides a robust, all mechanical fluid metering device 17 for use in an aircraft.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shock strut for supporting and dampening a load with a two-phase dampening characteristic, said shock strut comprising:
   an outer cylinder having a closed end and an open end;
   an inner cylinder having a closed end and an open end, said inner cylinder slidably mounted within the open end of the outer cylinder;
   a first piston slidably mounted between the ends of the outer cylinder and defining a first fluid chamber with the closed end of the outer cylinder;
   a second piston slidably mounted between the ends of the inner cylinder and defining a second fluid chamber with the closed end of the inner cylinder;
   a fluid metering apparatus positioned between the pistons, wherein a third fluid chamber is defined between the metering apparatus and the first piston on an opposite side of the first piston from the first fluid chamber and wherein a fourth fluid chamber is defined between the metering apparatus and the second piston on an opposite side of the second piston from the second fluid chamber, said metering apparatus configured to progressively control fluid flow into the third and fourth fluid chambers, leading to compression of the first and second fluid chambers and generating the two-phase dampening characteristic.

2. A shock strut of claim 1, wherein the first and second fluid chambers contain a gas.

3. A shock strut of claim 2, wherein the third and fourth fluid chambers contain a relatively incompressible fluid.

4. A shock strut of claim 3, wherein the first and second fluid chambers are sealed to contain a fixed amount of the gas.

5. A shock strut of claim 1, wherein the fluid metering apparatus includes a metering pin extending through an orifice defined by a metering plate.

6. A shock strut of claim 5, wherein the metering pin defines an elongate opening having sufficient length to maintain fluid communication between the third and fourth fluid chambers from full extension through full compression.

7. A shock strut of claim 6, wherein a clearance defined between the metering pin and plate is configured to control fluid flow from a fifth fluid chamber into the fourth fluid chamber.

8. A shock strut of claim 6, wherein the elongate opening of the metering pin includes a neck on an end adjacent the first fluid chamber.

9. A shock strut of claim 1, wherein the metering device includes a fifth fluid chamber in fluid communication with the fourth fluid chamber.

10. A shock strut of claim 1, wherein the outer cylinder includes a housing supporting therein a first piston-supporting wall structure configured to slidably support the first piston and wherein the inner cylinder includes a housing supporting therein a second piston-supporting wall structure configured to slidably support the second piston.

11. A shock strut of claim 10, wherein the first piston-supporting wall structure supports a metering pin of the metering device on its open end and the second piston-supporting wall structure supports a metering plate of the metering device on its open end and the metering pin extends through the metering plate.

12. A shock strut of claim 11, wherein the metering device includes a fifth fluid chamber in fluid communication with the third fluid chamber through at least one orifice defined in the first piston-supporting wall and in fluid communication with the fourth fluid chamber through a clearance defined between the metering pin and the metering plate.

13. A shock strut of claim 1, wherein the second one of the cylinders has an H-shaped cross-section.

14. A method of controlling fluid flow through a shock strut so as to provide two phases of support and dampening characteristics, said method comprising:

dampening an initial load by metering fluid flow from a fourth fluid chamber into a third fluid chamber on one side of a first piston and compressing a first fluid chamber on the other side of the first piston; and dampening a second load by metering fluid flow from a fifth fluid chamber into a fourth fluid chamber on one side of a second piston and compressing a second fluid chamber on the other side of the second piston;

wherein dampening initial and second loads is accompanied by compression of the shock strut to a shorter length.

15. A method of claim 14, wherein metering fluid flow from the fourth fluid chamber into the third fluid chamber includes allowing fluid to flow through a metering pin having one end in communication with the third fluid chamber and another end in communication with the fourth fluid chamber.

16. A method of claim 15, wherein metering fluid flow from the fifth fluid chamber into the fourth fluid chamber includes allowing fluid to flow between the metering pin and a metering plate which defines an orifice through which the metering pin extends.

* * * * *